UNITED STATES PATENT OFFICE.

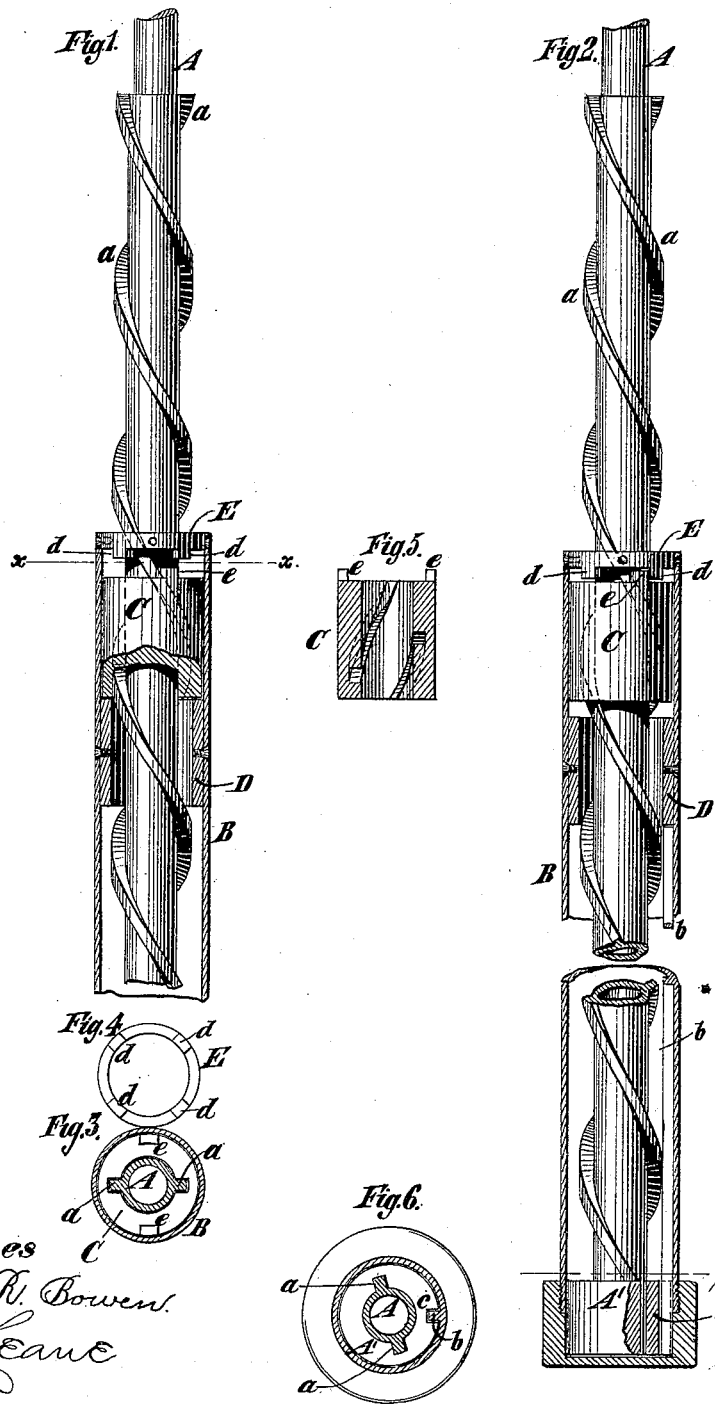

BENJAMIN B. LEWIS, OF BRISTOL, CONNECTICUT.

MECHANICAL MOVEMENT.

SPECIFICATION forming part of Letters Patent No. 271,481, dated January 30, 1883.

Application filed June 27, 1882. (No model.)

*To all whom it may concern:*

Be it known that I, BENJAMIN B. LEWIS, of Bristol, in the county of Hartford and State of Connecticut, have invented a certain new and useful Improvement in Mechanical Movements, of which the following is a specification.

The object of my improvement is to produce a new mechanical movement, whereby one part of a tubular form fitting upon another part may be adjusted relatively to each other, and when let free will become automatically locked in position.

The improvement consists in the combination of a rod, a tube fitting thereto, so that either may have a longitudinal but not a rotary movement relatively to the other, a nut or analogous device fitting between the rod and tube, engaging with a screw-thread of quick pitch, with which the said rod or tube is furnished, and actuated by gravity or an equivalent force to rotate, and thereby move independently of either the rod or tube, a stop for limiting the independent movement of the nut, and a non-rotary device, whereby when the movement of either the rod or tube relatively to the other becomes excessively rapid the nut will be locked, so as to be prevented from further rotation, and will thereby prevent further motion of the rod or tube relatively to the other.

The improvement also consists in the combination of a rod provided with an external screw-thread of quick pitch, a tube fitting thereon, so that either the rod or tube may be capable of a longitudinal movement relatively to the other, but locked to the rod, so that neither shall be capable of an independent rotary movement, a nut arranged within the tube, engaging with the screw-thread of the rod and actuated by its gravity or an equivalent force to rotate around the rod and move upon the same in one direction independently of any movement of either the rod or tube, a stop in the tube for limiting the independent movement of the nut, and a non-rotary device, whereby when the movement of the rod or the tube relatively to the other is excessively rapid the nut will be locked to the tube, so as to be prevented from further rotation, and will prevent further motion of the rod or tube relatively to the other.

This mechanical movement may with advantage be used in an extension-chandelier, or for various other purposes. It may prove useful as a safety device for elevators. Its uses are so numerous as to defy enumeration here without devoting too much space to their mention. If the parts are used in a horizontal position a spring may be used to impart to the nut that tendency to move in one direction along the screw which its gravity induces when the parts are used in a vertical position.

In the accompanying drawings, Figure 1 is a central longitudinal section of certain parts embodying the improvement. Fig. 2 is a similar view of the parts in a different position. Fig. 3 is a transverse section of the parts taken at the plane of the dotted line $x\ x$, Fig. 1. Fig. 4 is an end view of a device for locking the nut comprised in these parts to a tube. Fig. 5 is a longitudinal section of the nut; and Fig. 6 is a transverse section of the rod and tube, showing the manner in which they are to be combined to be precluded from independent longitudinal movement.

Similar letters of reference designate corresponding parts in all the figures.

A designates a rod, which may be of tubular form, and has on its exterior a screw-thread or screw-threads, $a$, of quick pitch.

B designates a tube loosely surrounding the rod A. It is combined with the rod, so that neither can have an independent rotary movement, but so that either can have an independent longitudinal movement. This result is attained by means of a longitudinal rib, $b$, on the interior of the tube, fitting in a groove or notch, $c$, in a tail-piece, A', affixed to the inner end of the rod.

C designates a nut applied to the rod A within the tube B, and adapted to rotate and descend along the rod under the influence of gravity.

D designates a stop of annular form, affixed to the interior of the tube B below the nut C.

E designates a non-rotary device, also of annular form, affixed to the interior of the tube B above the nut. This device has on the under side a number of projections, $d$, and the nut has on the upper side a number of projections, $e$. When the projections $e$ of the nut engage with the projections $d$ of the device E the nut is precluded from rotating and the tube and rod are locked together. If, now, the tube is raised or the rod depressed relatively to the other part sufficiently to disengage the projections of the nut C and the device E, the nut will rotate and descend along the rod until it is arrested by the stop D. If, then, the tube is lowered or the rod raised at a speed corresponding to that at which the nut can, by its gravity, rotate and move lengthwise of the nut, the device E will be inoperative; but as soon as the speed is accelerated the nut and the device E will come nearer together and their projections will engage and lock the rod and tube together. It will be seen that the rod and tube may be thus caused to lock automatically in any position.

This mechanical movement is very simple and inexpensive.

Obviously I may omit the screw-threads of the rod A and provide the tube B with internal screw-threads, and that in such case, in lieu of the nut C, I may employ an analogous device having external screw-threads and yet attain the results hereinbefore described.

What I claim as my invention, and desire to secure by Letters Patent, is—

1. The combination of a rod, a tube fitting thereto, so that either may have a longitudinal but not a rotary movement relatively to the other, a nut or analogous device fitting between the rod and tube, engaging with a screw-thread of quick pitch, with which the said rod or tube is furnished, and actuated by gravity or an equivalent force to rotate, and thereby move independently of either the rod or tube, a stop for limiting the independent movement of the nut, and a non-rotary device, whereby, when the movement of either the rod or tube relatively to the other becomes excessively rapid, the nut will be locked, so as to be prevented from further rotation, and will thereby prevent further motion of the rod or tube relatively to the other.

2. The combination of a rod provided with an external screw-thread of quick pitch, a tube fitting thereon, so that either the rod or tube may be capable of a longitudinal movement relatively to the other, but locked to the rod, so that neither shall be capable of an independent rotary movement, a nut arranged within the tube, engaging with the screw-thread of the rod and actuated by its gravity or an equivalent force to rotate around the rod and move upon the same in one direction independently of any movement of either the rod, or tube, a stop in the tube for limiting the independent movement of the nut, and a non-rotary device, whereby, when the movement of the rod or the tube relatively to the other is excessively rapid, the nut will be locked to the tube, so as to be prevented from further rotation, and will prevent further motion of the rod or tube relatively to the other, substantially as specified.

3. The combination of the rod A, provided with a screw-thread or screw-threads, a, the tube B, the rib b, the groove or notch c, the nut C, provided with projections e, the stops D, and the non-rotary device E, provided with projections d, substantially as specified.

BENJAMIN B. LEWIS.

Witnesses:
ASAHEL BROCKET,
BENJ. F. HAWLEY.